United States Patent [19]

Bontems et al.

[11] Patent Number: 5,114,762
[45] Date of Patent: May 19, 1992

[54] PROCESS FOR MANUFACTURING COMPOSITE TUBES

[75] Inventors: Maurice Bontems; Denis Desmicht, both of Pagny sur Moselle, France

[73] Assignee: Le Carbone Lorraine, Courbevoie, France

[21] Appl. No.: 606,902

[22] Filed: Oct. 31, 1990

[30] Foreign Application Priority Data

Nov. 14, 1989 [FR] France .................. 89 15284

[51] Int. Cl.$^5$ .............................. B29C 53/42
[52] U.S. Cl. .................. 428/34.5; 428/34.6; 428/34.7; 428/136; 264/154; 264/273; 264/257; 264/310; 264/59; 156/173; 156/174
[58] Field of Search ........... 264/257, 258, 310, 311, 264/273, 154, 155, 156, 59; 156/173, 174; 428/34.1, 34.5, 34.6, 34.7, 36.1, 36.2, 36.3, 36.91, 57, 58, 61, 121, 123, 130, 136, 213, 224, 227, 228, 235

[56] References Cited

U.S. PATENT DOCUMENTS 2,859,151 11/1958 Usab .................. 264/311
4,002,715 1/1977 Usui .................. 264/257

Primary Examiner—Jay H. Woo
Assistant Examiner—Jeremiah F. Durkin, II
Attorney, Agent, or Firm—Dennison, Meserole, Pollack & Scheiner

[57] ABSTRACT

Process for manufacturing tubes of a composite material from a preimpregnated fibrous reinforcing sheet whose width is split into a strip portion and a casing portion, where the thickness of the sheet is slit in the casing portion. A mandrel is inserted into the casing portion and rotated to cause the strip portion to be rolled around the mandrel, and the rolled strip and mandrel are placed into a plastic case for cross-linking. The process can be applied to the manufacture of tubes of small diameter, such as fishing rods, golf clubs and boat masts, and to the manufacture of porous tubes for use as a filtering material or filter membrane support.

13 Claims, 1 Drawing Sheet

PROCESS FOR MANUFACTURING COMPOSITE TUBES

BACKGROUND OF THE INVENTION

1. Field of the Invention

The invention is concerned with tubes made of a composite material and consisting of a fibrous reinforcement. More particularly, the invention is concerned with a process for the manufacture of said tubes.

2. Description of Related Art

Processes for the manufacture of tubes of composite material with a resin and a fibre reinforcement conventionally comprise the following steps:

a) manufacture of a mandrel of a suitable shape: cylindrical or conical, for example, for a mast or a fishing rod.

b) cutting out a sheet of material into widths, the shape and size of each width depending on the geometry of the tube and on the number of rolls which are to be made.

c) preimpregnation of the material with a resin constituting the matrix of the composite substance. After impregnation, the preimpregnated material, known thus as a "prepreg" is either stored or implemented for the next step.

d) fixing an edge of the width of the prepreg onto a generatrice of the mandrel: this operation is usually carried out by heat sealing using a steam iron. The edge of the prepreg is firstly positioned on a generatrice, and a steam iron is applied to it. Under the effects of the heat and also as a result of the pressure exerted, the prepreg which appeared dry and non-sticky initially, becomes sticky and adheres to the mandrel.

e) rolling around the mandrel using a suitable system such as a laterally moving heating table.

f) the tube thus formed is enveloped by a case, plastic or cellophane film, intended to maintain the tube's cohesion during the subsequent step.

g) cross-linking of the composite material, removal of the mandrel and removal of the plastics case.

h) possible heat treatment.

A process of this kind is described in Japanese Application No. 54-155727.

SUMMARY OF THE INVENTION

The initial aim of the invention is a process for manufacturing composite tubes which is more economical than the prior art process.

Development of composite materials is actually inhibited by the high cost of these materials, due partly to the cost of raw materials, but also to the high cost of transformation: even though some steps are automated to a certain extent, cutting out of the widths, for example, others which are carried out by hand for small-scale production, constitute bottlenecks, curb productivity and delay the introduction of automation.

In this respect, the step whereby the width of the prepreg is fixed onto a generatrice of the mandrel is particularly lengthy and delicate, especially if the tubes are of small diameter, for example less than 20 mm in diameter, and very long, for example more than 500 mm in length.

The chief aim of the invention is a fixing process for the width of the prepreg, the process obviating the afore-mentioned drawbacks. Other aims of the invention will emerge from the description.

DETAILED DESCRIPTION OF THE INVENTION

The chief aim of the invention is a process for manufacturing a tube of composite material, the process consisting in use of a reinforcing sheet cut out into widths, impregnation thereof with a resin, fixing of each preimpregnated width onto a mandrel, rolling of the prepreg around the mandrel, placing it inside a plastics case, cross-linking of the resin, removal from the plastic case and from the mandrel, and possibly cokefaction of the tube thus obtained, characterised in that a reinforcing sheet (1) is used which consists of a strip part (2) and a case part (3) with a uniform, smooth internal surface, of a geometry which is adapted to the mandrel (4), and characterised in that the prepreg, obtained from said reinforcing sheet, is fixed onto the mandrel (4) by introducing said mandrel into the case part (3), in such a way that rotation of the mandrel can cause the strip part (2) to be rolled, and in such a way that a tube is obtained which has a uniform, smooth interior surface. FIGS. 1 to 4 will assist the understanding of the invention.

The invention thus eliminates positioning of the edge of a width on a generatrice of the mandrel, and sticking to the hot iron. In fact, the mandrel simply has to be slid into the case. The diameter D of the mandrel is very close to, slightly greater than, that d of the inside of the case (see FIGS. 1 and 4), so that in view of the fact that the material has a certain elasticity, the mandrel can slide with ease, and the friction forces between the mandrel and the case are sufficient to permit the strip part to be rolled.

The process is easy to automate: in fact, starting with a pile of preimpregnated widths, the orifice of the case of one width is automatically positioned so that it faces one end of the mandrel. The orifice is partly opened, using a device consisting of two blow-holes for example, so as to enable the mandrel to be introduced (see FIG. 3), and the rolling operation is then carried out in the known way.

Another advantage of this process is that the interior surface of the tube is uniform and smooth. This feature which is of little significance with some applications is essential in others, as will be shown in this description hereinafter.

Finally, the absence of the adhesion strip (zone for application of the steam iron) contributes to the uniform nature of the interior surface of the tube, and facilitates removal of the mandrel.

According to the invention, the thickness $e$ of the material constituting the strip is advantageously twice the thickness $e'$ of the part of the material which constitutes the case. In fact, manufacture of the preimpregnated material, or prepreg, consists in impregnation with resin followed by a drying operation between the rollers which allows the amount of resin to be controlled: since the case part, lying flat, is the same in thickness as the strip part (see FIG. 2), resin will be distributed homogeneously over the whole of the width, and this is advantageous to the end quality of the tube.

It can be advantageous to select reinforcing sheets (1) for the strip part and case part which differ in texture, in particular having a mesh hole which differs in the case part (3) and strip part (2). Depending on the application, a small mesh hole, for example less than 50 $\mu$m, is selected for the strip part, and a large mesh hole, greater than 500 $\mu$m for example, is selected for the case part, or vice versa: small mesh hole for the case part and large mesh hole for the strip part.

This assymetry with respect to the thickness of the tube is particularly desirable with filtration. For such application, the tube obtained after the cross-linking operation is subjected to carbonization, and a porous tube is obtained which can be used in filtration either as it is or as a filtration membrane suppot. The significance of a filtering material which is assymetrical is known: a layer of fine pores ensures that the separation operation is carried out, whereas another layer which does not have any loss of charge from discharge of the filtrate, ensures that the support function is carried out. The liquid to be filtered generally circulates inside the filtration tubes: in that case, the case part will have a small mesh hole and the strip part will have a larger mesh hole. Tubes of this kind are particularly resistant to breakage.

As already mentioned, the tubes obtained according to the invention have an internal surface which is uniform and smooth: this feature is particularly desirable for use in filtration operations.

The reinforcing sheet is woven from known fibres so as to confer increased mechanical properties upon the final composite material. It is preferable if the fibres aramid are selected from carbon fibres or their forerunners, glass fibres, polyamide fibres of the Kevlar ® type. However, if the tubes are intended for use in filtration, the preferred fibre is carbon fibre or its forerunners.

The matrix of tubes according to the invention is constituted of a resin, for example a thermosetting resin, selected from the epoxy, unsaturated polyester, phenolic, or furan resins.

If used for filtration purposes, a phenolic or furan resin is preferably selected which allows there to be a sufficient amount of carbon, after cokefaction, to bind the fibrous reinforcing member.

The tubes according to the invention are preferably cylindrical or frustoconical in shape, but the invention also permits manufacture of a tube of a square cross-section, for example.

Although there is no limit to the size, length or diameter in realising the invention, the privileged domain of the invention, that where production yields are greatest, is that of tubes which have a small diameter of less than 10 cm, more particularly less than 20 mm, mass produced products, in particular, fishing rods, golf clubs, masts for boats and windsurfing boards, and porous tubes which can themselves be used as a filtering element or as a filtering membrane support.

DESCRIPTION OF THE PREFERRED EMBODIMENT

Figure 1:
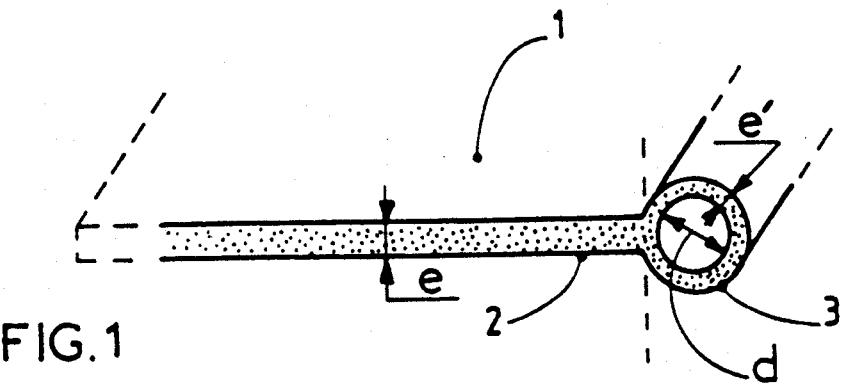
FIG. 1 shows a section through a reinforcing sheet (1) consisting of a strip part (2) of thickness e, a case part (3) of thickness e', which, unrolled, has an inside diameter d.
Figure 2:
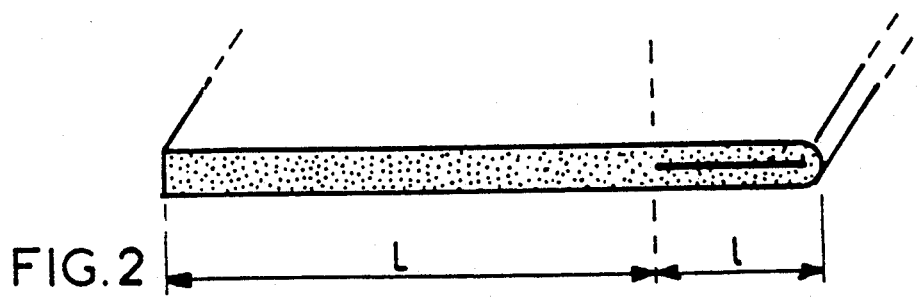
FIG. 2 shows a width which is the same in thickness in the strip part thereof of length L and the case part thereof of width 1, when flat.

As shown in the drawings, the process of the invention utilizes a reinforcing sheet 1 having a thickness e and divided into two sections, a strip portion 2 and a casing portion 3. As shown most clearly in FIG. 2, the sheet in the casing portion is slit near one end in the direction of the width and parallel to the thickness, thus creating a casing having a diameter d shown in FIG. 1. The casing portion has a wall thickness e' which is equal to half of sheet thickness e.

Figure 3:
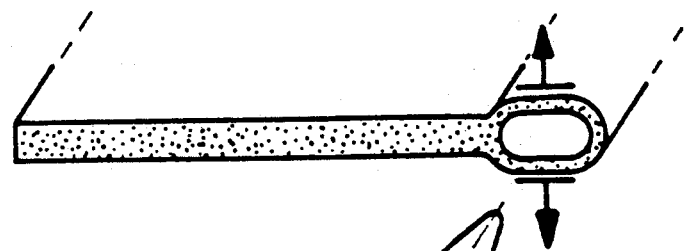
FIG. 3 shows a device having two blow-holes for partially opening the case and to allow the mandrel (4) to be inserted.
Figure 4:
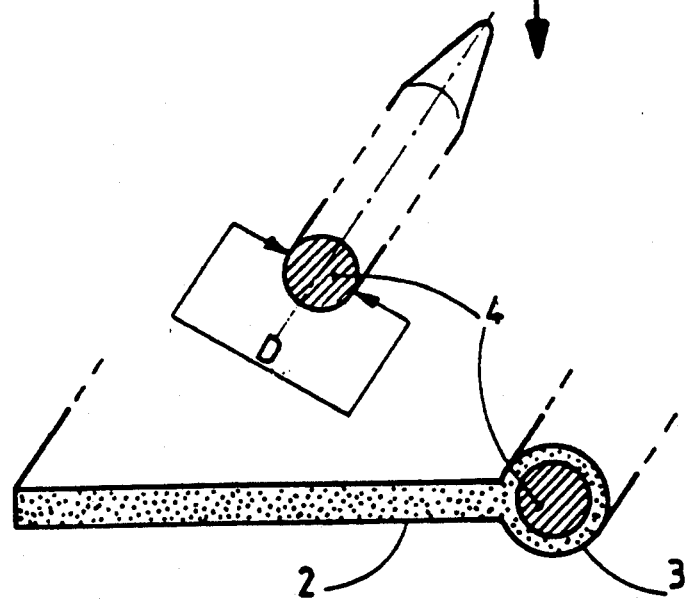
FIG. 4 shows the width and the mandrel (4) in a position before the rolling operation.

The diameter d of the casing is selected so that it is about the same as the diameter D of mandrel 4 which is inserted into the casing, as shown in FIGS. 3 and 4.

Note that in the drawings, the thickness has been exaggerated with respect to the other dimensions so as to facilitate the description of the invention.

EXAMPLE

A porous carbon-carbon tube has been manufactured, the outer diameter of which is 8.5 mm±0.2 mm, the internal diameter of which is 6 mm±0.05 mm, and the length of which is 1200 mm.

For the tube, a sheet was used which is woven from carbon fibre, consisting of a strip part and a case part. The sheet which is 85 mm in width and 0.6 mm in thickness is a 18 g/m linear cotton serge. The strip part measures 75 mm in width and the case part measures 10 mm in width, with an interior case diameter of 5.77 mm and thickness of 0.3 mm.

The sheet was impregnated with catalyzed phenolic resin, in solution with water. After having dried between two rollers so as to keep 48% of resin, a polycondensation operation is effected so as to obtain a prepreg.

The prepreg was then introduced onto a stainless steel mandrel which had previously been coated with stripping wax. The mandrel measures 1300 mm in length, for a sheet of 1200 mm in length. It is 6 mm in diameter.

The strip part was then rolled on a heating table at 120° C., and the whole thing was immediately encased by spirally rolling it in a 20 mm wide cellophane strip.

Then, after the prepreg had undergone a hardening cycle, the mandrel was removed. The tube thus obtained was baked at a temperature above 1000° C. It has homogeneous porosity and a very smooth interior surface. It can be used as a filtering element or filter membrane support.

We claim:

1. A process for manufacturing a tube of composite material, comprising the steps of:

providing a reinforcing sheet of defined width and thickness and first and second ends, the thickness of said sheet being slit parallel to the width of the sheet over a portion of the width and near said first end of the width, thereby forming a casing portion of the sheet where slit, and a strip portion of the sheet where not slit, said casing portion having walls defining a uniform and smooth interior surface of a geometry adapted to a known mandrel;

impregnating said reinforcing sheet with a resin to form a prepreg;

inserting said known mandrel into said casing portion;

rotating said mandrel to thereby roll said strip portion around said mandrel;

placing said rolled prepreg and mandrel in a plastic case;

cross-linking the resin which impregnates the sheet; and removing the mandrel from the sheet with cross-linked impregnated resin to form a tube.

2. A process to claim 1, wherein the thickness of the strip portion is double the thickness of the walls of the casing portion.

3. A process according to claim 1 or claim 2 wherein the texture of the strip portion is different from that of the casing portion.

4. A process according to claim 3 in which the casing portion has a mesh structure with mesh holes less than 50 $\mu$m, and in which the strip portion has a mesh texture with mesh holes greater than 500 $\mu$m.

5. A process according to claim 3 in which the strip portion has a mesh texture with mesh holes which are less than 50 $\mu$m, and in which the casing portion has a mesh texture with mesh holes which are greater than 500 $\mu$m.

6. A process according to claim 1 or 2, in which said reinforcing sheet (1) is woven from fibres selected from the group consisting of carbon fibres, carbon fibre precursors, glass fibres and aramid type fibres.

7. A process according to claim 1, in which said resin is a thermosetting resin selected from the group consisting of epoxy, unsaturated polyester, phenolic and, furan resins.

8. A process according to claim 1, in which said tube is frustoconical or cylindrical, with a maximum diameter of less than 10 cm.

9. A process according to claim 1 or 2, in which the mandrel is inserted into said casing portion before impregnation in such a way as to enable manufacture of tubes on an automated production line.

10. A process according to claim 6, in which said reinforcing sheet (1) is woven from carbon fibres carbon fiber precursors, and in which the tube is subjected to carbonization so as to render said tube porous.

11. Tubes produced by the process of claim 1 for use in fishing rods, golf clubs, masts for boats and windsurfing boards.

12. Porous tubes produced by the process of claim 10 for use as filtration tubes or filtering membrane supports.

13. Process according to claim 1, additionally comprising carbonizing the tube.

* * * * *

UNITED STATES PATENT AND TRADEMARK OFFICE
CERTIFICATE OF CORRECTION

PATENT NO. : 5,114,762

DATED : May 19, 1992

INVENTOR(S) : Maurice Bontems et al

It is certified that error appears in the above-identified patent and that said Letters Patent is hereby corrected as shown below:

```
Column 3, line 27, delete "aramid";
         line 28, after "fibres," insert --and aramid--.
```

Signed and Sealed this

Twenty-eighth Day of September, 1993

*Attest:*

BRUCE LEHMAN

*Attesting Officer*     *Commissioner of Patents and Trademarks*